US007733599B2

(12) United States Patent
Shigenaga et al.

(10) Patent No.: US 7,733,599 B2
(45) Date of Patent: Jun. 8, 2010

(54) STRUCTURE TO PREVENT DEFORMATION OF MAGNETIC DISK DEVICE HOUSING

(75) Inventors: Hiroaki Shigenaga, Kanagawa (JP);
Sunao Yonekawa, Kanagawa (JP);
Masao Iwakura, Kanagawa (JP);
Masami Miyatake, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 686 days.

(21) Appl. No.: 11/499,482

(22) Filed: Aug. 3, 2006

(65) Prior Publication Data

US 2007/0047130 A1 Mar. 1, 2007

(30) Foreign Application Priority Data

Aug. 26, 2005 (JP) .............................. 2005-245817

(51) Int. Cl.
*G11B 5/012* (2006.01)
*G11B 17/00* (2006.01)
*G11B 33/14* (2006.01)
(52) U.S. Cl. ................................ 360/97.01; 360/97.02
(58) Field of Classification Search ................ 360/74.1, 360/97.01, 97.03, 98.01, 97.02; 411/428, 411/534
See application file for complete search history.

(56) References Cited

U.S. PATENT DOCUMENTS 4,845,581 A 7/1989 Bronshvatch (Continued)

FOREIGN PATENT DOCUMENTS

EP  0 428 290 A2  5/1991

(Continued)

OTHER PUBLICATIONS

"Expansion Absorbing Element To Prevent Warping Of Actuator And Media Axes" IBM Technical Disclosure Bulletin, IBM Corp. New York, US ; vol. 33, No. 2, Jul. 1, 1990, XP000123636; ISSN: 0018-8689.

(Continued)

*Primary Examiner*—Andrea L Wellington
*Assistant Examiner*—Gustavo Polo
(74) *Attorney, Agent, or Firm*—Townsend and Townsend and Crew LLP; John Henkhaus

(57) ABSTRACT

Embodiments of the invention provide a magnetic disk unit in which there has been adopted a structure fixing a base and a top plate and preventing a deformation by a bimetal effect. In one embodiment, the magnetic disk unit includes a magnetic disk; a head drive mechanism in which is mounted a head accessing the magnetic disk; a base accommodating the magnetic disk and the head drive mechanism, and possessing a flat part, in which a threaded hole has been formed, in a circumference of an opening edge; and a top cover which is formed by a material whose thermal expansion coefficient differs from that of the base, in which there is provided an escape hole, for a screw, position-aligned to the threaded hole of the flat part, and which is attached to the base by the screw penetrating through the threaded hole and the escape hole for the screw. A slip mechanism for reducing a slip friction resistance is provided respectively in a contact portion between the flat part and the top cover, and a contact portion between a head part of the screw and the top cover.

13 Claims, 4 Drawing Sheets

U.S. PATENT DOCUMENTS

| | | | |
|---|---|---|---|
| 4,937,691 A | | 6/1990 | Narayan et al. |
| 5,214,549 A | * | 5/1993 | Baker et al. ............... 360/97.02 |
| 5,282,101 A | | 1/1994 | Reinisch |
| 5,568,341 A | * | 10/1996 | Shikano ................... 360/97.02 |
| 6,046,393 A | * | 4/2000 | Rose ........................... 84/293 |
| 2002/0057521 A1 | * | 5/2002 | Imaino et al. ............ 360/97.01 |
| 2004/0057813 A1 | * | 3/2004 | Horng et al. ................ 411/534 |
| 2008/0024909 A1 | * | 1/2008 | Ang et al. ................ 360/98.01 |

FOREIGN PATENT DOCUMENTS

| | | |
|---|---|---|
| JP | 61-260486 A | 11/1986 |
| JP | 2-101392 | 8/1990 |
| JP | 06-162758 | 6/1994 |
| JP | 10184447 A * | 7/1998 |
| WO | WO96/17349 | 6/1996 |

OTHER PUBLICATIONS

European Search Report for EP Application No. 06012893.1-2210, dated Jun. 10, 2008, 6 pages total.

* cited by examiner (A)　　　　　　　(B)　　　　　　　(C)

STRUCTURE TO PREVENT DEFORMATION OF MAGNETIC DISK DEVICE HOUSING

CROSS-REFERENCES TO RELATED APPLICATIONS

This application claims priority from Japanese Patent Application No. JP2005-245817, filed Aug. 26, 2005, the entire disclosure of which is incorporated herein by reference.

BACKGROUND OF THE INVENTION

The present invention relates to an attachment structure of a base and a top cover in a storage device such as magnetic disk unit and magneto-optical unit, and more particularly relates to an attachment structure which prevents deformation of the base or the top cover due to a temperature change.

In the magnetic disk unit, a mechanical apparatus is constituted as a head disk assembly (hereafter, mentioned as HDA in the specification). This HDA is constituted by the base, a magnetic disk having been accommodated in the base, a head support mechanism, a spindle motor and electronic components etc., and by the top cover which forms a sealed structure by being joined to the base in order to form an enclosure to provide a clean air environment. In order to make the HDA into a sealed state, the top cover is screwed to the base.

In the head support mechanism of this magnetic disk unit, a head/slider performs reading/writing of data with respect to the rotating magnetic disk, and an actuator positions the head to a predetermined position. A drive mechanism of this actuator is a voice coil motor (hereinafter, mentioned as VCM in the specification) constituted by a voice coil, a magnet and a yoke.

In the head support mechanism of the magnetic disk unit like this, if the magnetic disk rotates, the slider having an air bearing surface (ABS) slightly lifts from a magnetic disk surface. The head can perform the reading/writing of the data in a predetermined position of the disk surface by rotating, by a driving force of the VCM, the slider about a pivot shaft in an approximately radial direction of the magnetic disk under a state that the slider has slightly floated from the magnetic disk surface. The positioning of the head is performed by the fact that the head reads a servo data having been previously recorded in the magnetic disk and this information is fed back to the actuator. If the head is positioned, a recording or regeneration of the information to or from a recording or recorded face of the magnetic disk is performed.

For the above magnetic disk unit, in a case where the materials of the base and the top cover (typically metals) are different and have different thermal expansion coefficients, a bimetal effect occurs depending on the use environment temperature. FIG. 4 shows a deformation state of the HDA in which this bimetal effect has occurred. In an HDA 100, the material of a base 101 is aluminum, and the material of a top cover 102 is a stainless steel whose thermal expansion coefficient is smaller than that of the aluminum. Further, FIG. 4(A) is a drawing showing an aspect in which the base 101 of the aluminum deforms under a high temperature environment, and FIG. 4(B) is a drawing showing an aspect in which the base 101 of the aluminum deforms under a low temperature environment.

In this HDA 100, the top cover 102 is fixed to the base 101 by screws 103, and the base 101 of the aluminum becomes larger in its thermal expansion coefficient than the top cover 102 of the stainless steel. Accordingly, under the high temperature environment, a bottom part 101a of the base 101 deforms so as to bend downward as shown in FIG. 4(A) and, under the low temperature environment, the bottom part 101a of the base 101 deforms so as to bend upward as shown in FIG. 4(B).

If the bottom part 101a of the base 101 deforms so as to bend downward and/or upward, a positional relation between a magnetic disk 104 and a head (not shown in the drawing) having been provided in a slider 106 of an HSA (head stack assembly) 105 deviates. This is because the magnetic disk 104 is fixed to a spindle hub of a spindle motor 107 which is provided in the bottom part 101a of the base 101, and the head support mechanism 105 is rotatably fixed to a pivot shaft 109 which is provided in the bottom part 101a of the base 101 through a carriage 108.

In a case where the base 101 and the top cover 102 deform while expanding or contracting by the same amount, no problem occurs in an operation mechanism inside the HDA. However, if the base deforms under a mode having been shown in FIG. 4 and thus the positional relation between the magnetic disk 104 and the head of the head support mechanism 105 deviates, an offtrack error occurs or a floating posture of the slider 106 of the head support mechanism 105 changes. The offtrack error refers to the situation in which, when the head support mechanism is mounting plural heads/sliders, a track to which a certain head corresponds when the other head has been positioned to a specified cylinder deviates before and after a temperature change.

If the offtrack error occurs in the head/slider, it becomes difficult to write the data to a right track or regenerate the data from a purposive track. Further, if the floating posture of the head/slider changes, a flying height of the head changes, so that a dysfunction arises in the recording and the regeneration of the data. There are various proposed techniques for preventing the bimetal effect by the base and the top cover. See, e.g., JP-UM-A-2-101392 Gazette, JP-A-6-162758 Gazette, and International Laid-Open 96/17349 Pamphlet.

BRIEF SUMMARY OF THE INVENTION

In the magnetic disk unit of Patent Document 1, the deformation of the base due to the spindle motor and a difference in linear expansion coefficient between the actuator and the base is corrected by exerting a force on the base by an adjustment screw, thereby correcting a positional deviation of the magnetic head with respect to the magnetic disk. However, since this positional deviation changes by the use environment temperature, it has to be corrected each time the temperature changes.

Further, in the magnetic disk unit of Patent Document 2, the deformation of the base plate due to a difference in thermal expansion coefficient between a printed board and the base plate is absorbed by the elasticity of a rubber member by tightening a fixation screw through the rubber member when fixing the printed board to the base plate. However, the rubber member becomes hard if tightened by the fixation screw, so that a problem arises when its elastic function decreases.

Further, in a tape cartridge of Patent Document 3, the deformation of a base board and a cover member due to the difference in thermal expansion coefficient between the base board and the cover member is absorbed by an interstice generated between a through-hole of the base and an insertion part of a support pin having been inserted into the through-hole. However, since the base board and the cover member are not fixed so as not to move, it is unsuitable for a fixation structure of the base and the top cover of the magnetic disk unit.

In order to prevent the bimetal effect by the base and the top cover, it has been considered that materials of both are made the same. However, since the base is difficult in its molding by a die-cast, aluminum is used and, in order to cause the top cover to have a strength even if it is thin, stainless steel is used. This is because the die-cast is difficult for the stainless steel and, for the aluminum, its thickness must be thickened in order to ensure the strength. Consequently, since the function required of the base and the function required of the top cover are different, it is impossible to coincide the thermal expansion coefficients.

A feature of the present invention is to provide a magnetic disk unit in which there has been adopted a structure fixing the base and the top cover and preventing the deformation by the bimetal effect. Additionally, the present invention provides a magnetic disk unit in which, even if the use environment temperature changes, the positional relation between the magnetic disk and the head is maintained, thereby preventing an output dysfunction of the head. Another feature of the present invention is to provide a connection structure of a base and a top cover, which prevents the deformation by the bimetal effect.

According to the present invention, in order to prevent the base and the top cover, which have been tightly fastened by screws, from deforming under the bimetal effect, the base and the top cover are caused to slip in a plane direction of the base concerned even under a state of being fixed by the screws. FIG. 3 is a simplified constitutional view of models each of which shows the bimetal effect, wherein (A) is a view of the model under a normal temperature state, (B) a view of the model after the deformation under a high temperature state, and (C) a view of the model in which the present invention has been applied in order to avoid the deformation under the high temperature state.

In FIG. 3(A), it is the model in which both ends of two kinds of metal plates whose thermal expansion coefficients differ have been respectively screwed and, since a use environment is the normal temperature state, there is no deformation. In FIG. 3(B), when the model of FIG. 3(A) is placed under the high temperature state and the bimetal effect occurs, the model is deformed so as to slant to one of the metal plate whose thermal expansion coefficient is small. In FIG. 3(C), only one end of the model in which the two kinds of metal plates whose thermal expansion coefficients differ is screwed, and the other end in this model is not screwed and remains free. Accordingly, under the high temperature state, since it is possible to cause the metal plates to slip in the plane direction of the metal plates concerned, even if the bimetal effect occurs in the model, it is possible to prevent the deformation.

In accordance with an aspect of the present invention, a magnetic disk unit includes: a magnetic disk; a head drive mechanism in which there has been mounted a head accessing the magnetic disk; a base accommodating the magnetic disk and the head drive mechanism, and possessing a flat part, in which a threaded hole has been formed, in a circumference of an opening edge; and a top cover which is formed by a material whose thermal expansion coefficient differs from the base, in which there is provided an escape hole, for a screw, position-aligned to the threaded hole of the flat part, and which is attached to the base by the screw penetrating through the threaded hole and the escape hole for the screw; wherein a slip mechanism reducing a slip friction resistance is provided respectively in a contact portion between the flat part and the top cover, and a contact portion between a head part of the screw and the top cover.

In accordance with another aspect of the present invention, a magnetic disk unit includes: a magnetic disk; a head drive mechanism in which there has been mounted a head accessing the magnetic disk; a base accommodating the magnetic disk and the head drive mechanism, and possessing a flat part, in which a threaded hole has been formed, in a circumference of an opening edge; and a top cover which is formed by a material whose thermal expansion coefficient differs from the base, in which there is provided an escape hole, for a screw, position-aligned to the threaded hole of the flat part, and which is attached to the base by the screw penetrating through the threaded hole and the escape hole for the screw; wherein there is constituted such that, in a portion in which the flat part and the top cover contact, a friction coefficient in a tightening part of the screw becomes lower than a friction coefficient of other portion.

In accordance with another aspect of the present invention, a connection structure of a base and a top cover in a storage device includes: a base accommodating constitutional elements of the storage device and possessing a flat part, in which a threaded hole has been formed, in a circumference of an opening edge; and a top cover which is formed by a material whose thermal expansion coefficient differs from the base, in which there is provided an escape hole, for a screw, position-aligned to the threaded hole of the flat part, and which is attached to the base by the screw penetrating through the threaded hole and the escape hole for the screw; wherein there is constituted such that, in a portion in which the flat part and the top cover contact, a friction coefficient in a tightening part of the screw becomes lower than a friction coefficient of another portion.

Because the slip mechanism reducing the slip friction resistance is provided respectively in the contact portion between the flat part of the base and the top cover and the contact portion between the head part of the screw and the top cover, even if the bimetal effect occurs, it is possible to cause the base and the top cover to slip in the plane direction of the base concerned. As this slip mechanism, one may apply a lubricant to the contact portion, or dispense a mirror face working to the contact portion. Further, in the case where, in the portion in which the flat part and the top cover contact, the friction coefficient in the tightening part of the screw becomes lower than the friction coefficient of other portion, even if the bimetal effect occurs, it is possible to cause the base and the top cover to slip in the plane direction of the base concerned.

By the present invention, it is possible to provide in the magnetic disk unit a structure fixing the base and the top plate while preventing deformation by the bimetal effect. Additionally, by the present invention, it is possible to provide the magnetic disk unit in which, even if the use environment temperature changes, the positional relation between the magnetic disk and the head is maintained, thereby preventing the output dysfunction of the head. The present invention further provides a connection structure of the base and the top cover which prevents the deformation by the bimetal effect.

DETAILED DESCRIPTION OF THE INVENTION

Figure 1:
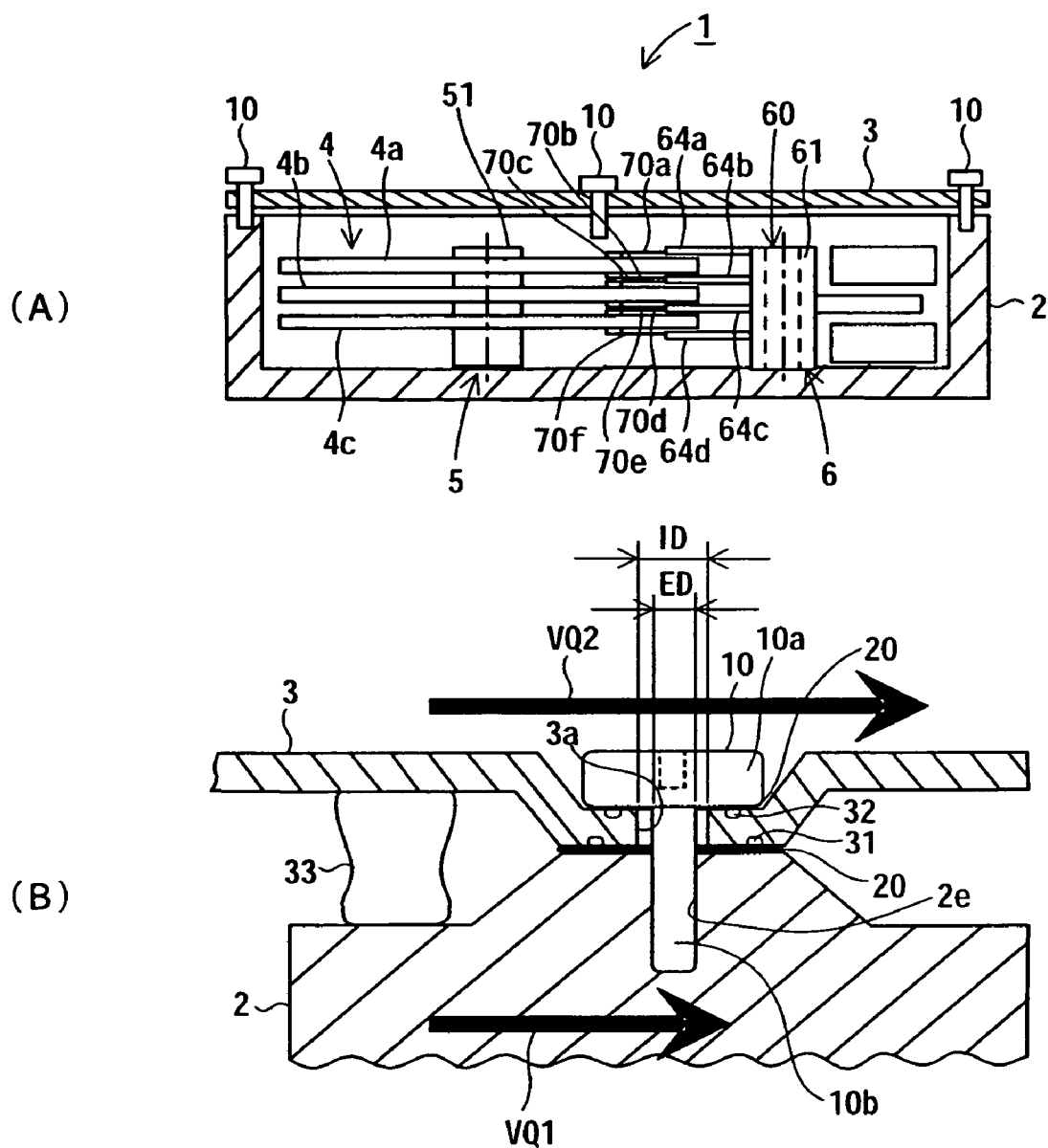
FIG. 1 is a view showing a magnetic disk unit according to an embodiment of the present invention.
Figure 2:
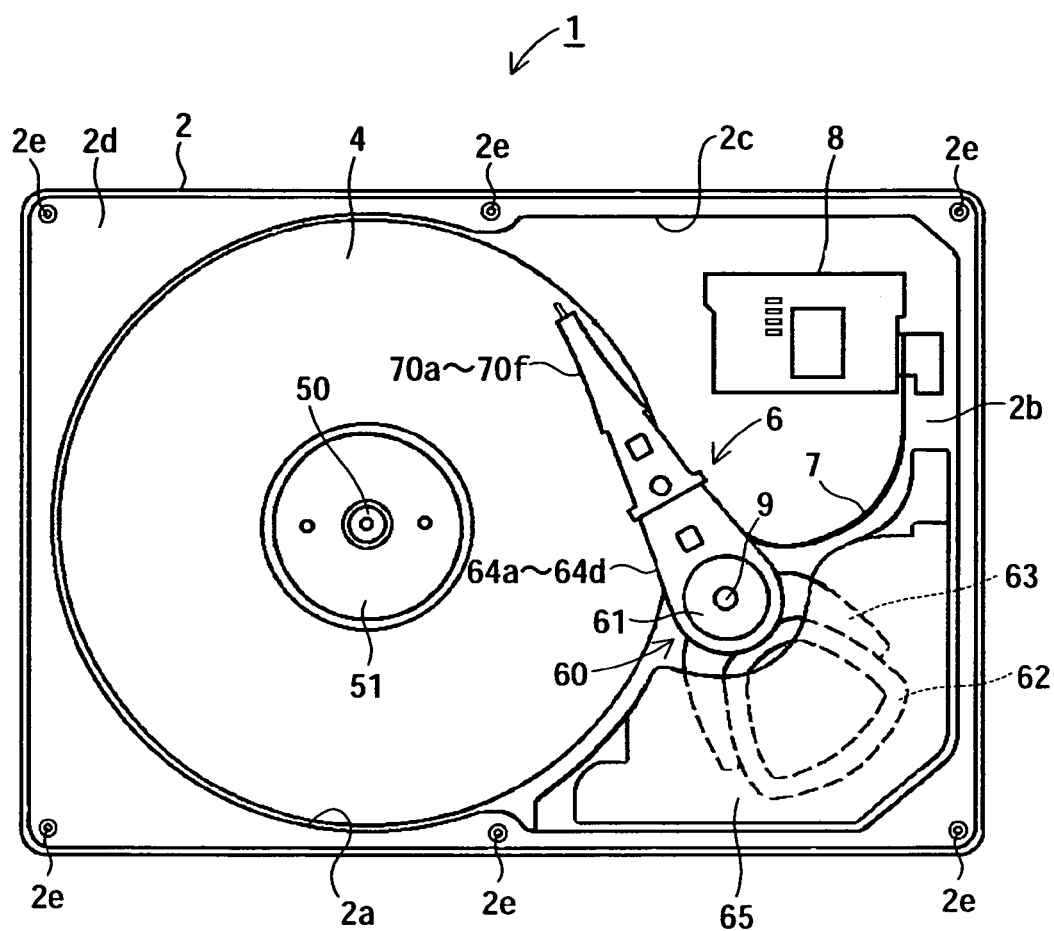
FIG. 2 is a plan view showing a schematic constitution of the magnetic disk unit in the present invention.
Figure 3:
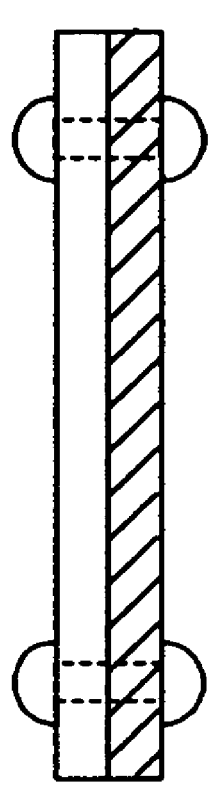
FIG. 3 is a simplified constitutional view of models each of which shows a bimetal effect.
Figure 3:
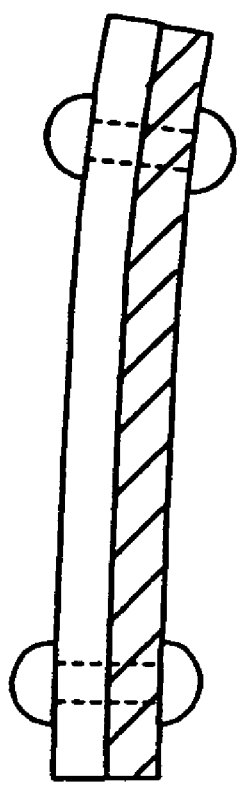
Figure 3:
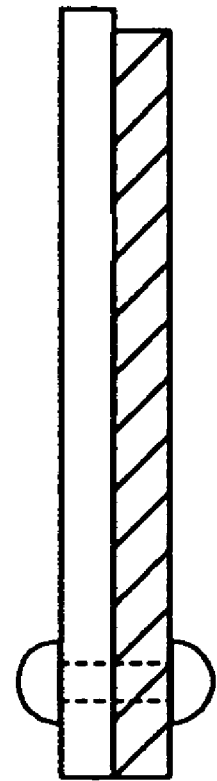
Figure 4:
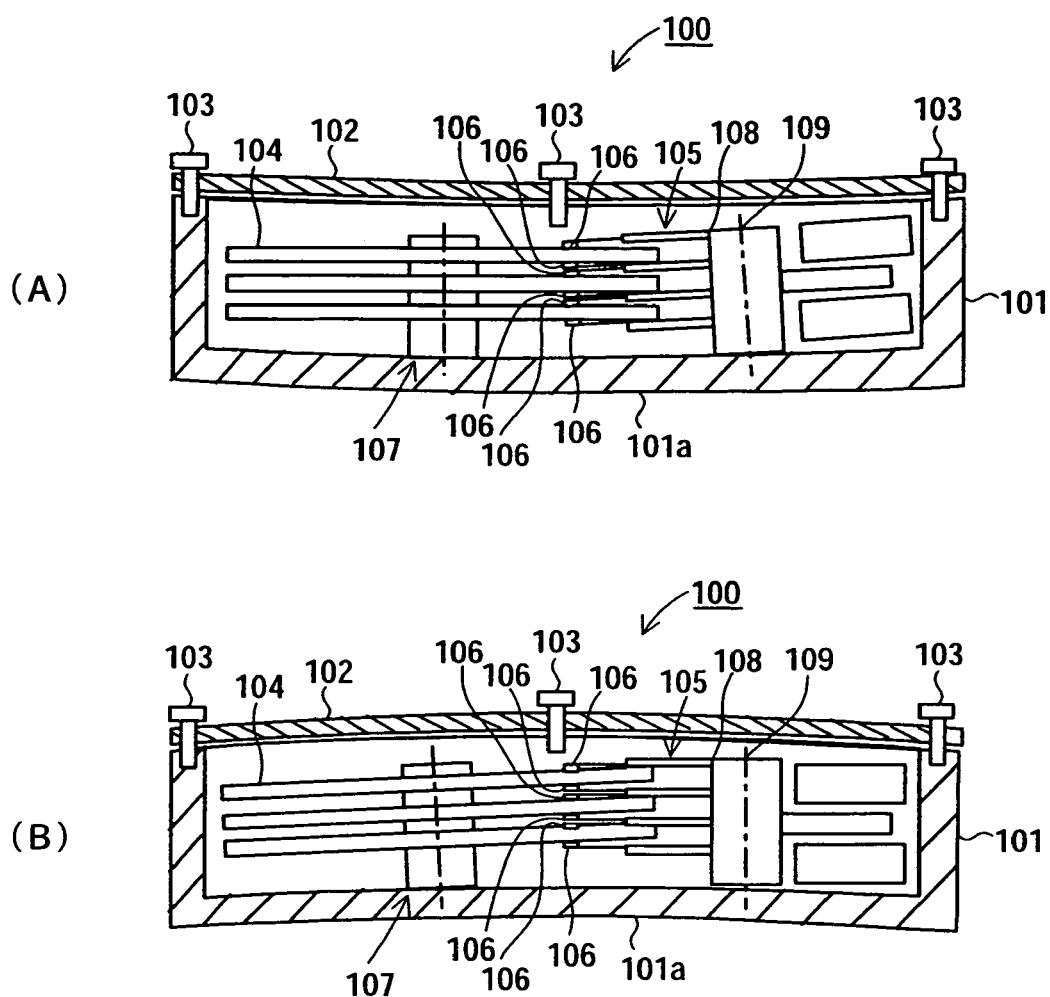
FIG. 4 is an explanatory view showing a deformation state of an HDA in a case where the bimetal effect has occurred in a conventional magnetic disk unit.

An exemplary embodiment of the present invention is described by referring to the drawings. Throughout the present specification, the same reference numeral is used to refer to the same element. FIG. 1 is a view showing an exemplary embodiment of the invention, in which a base and a top cover have been fixed by screws, wherein (A) is a whole sectional view, and (B) an enlarged sectional view. FIG. 2 is a plan view showing a schematic constitution of a magnetic disk unit in the present invention.

As shown in FIG. 1 and FIG. 2, a magnetic disk unit 1 forms a sealed space of clean air, which has been formed by a base 2 and a top cover 3 over an upper part of the base 2, and accommodates in its interior space a magnetic disk 4, a spindle motor 5 that is a head drive mechanism, an HSA 6, and the like. Further, into the base 2, there are incorporated a flexible cable 7 and an external connection terminal 8 mounted to the flexible cable 7. To the external connection terminal 8, there is connected a circuit board which is provided in an outside of the base 2 and which is for controlling an operation of the magnetic disk unit 1 and a data communication with the outside.

As to the magnetic disk 4, one disk or stack-like plural disks is or are fixed to an outer circumference of a spindle shaft 50 of the spindle motor 5 which is supported by a bottom face of base 2. In a case where the plural disks are provided in a stack, in order for the disks to rotate monolithically about the spindle shaft 50, each disk is attached to a spindle hub 51 while being stacked with a predetermined spacing width. In the present embodiment, three magnetic disks 4a-4c are provided in a stack.

The HSA 6 is constituted by a carriage 60 and head gimbal assemblies (hereinafter, mentioned as HGA in the specification) 70a-70f. The carriage 60 includes a pivot bearing 61, a coil support 63 holding a voice coil 62, and actuator arms 64a-64d. Behind the pivot bearing 61 fixed to an outer circumference of a pivot shaft 9, there is disposed a voice coil yoke 65 constituting, together with the voice coil 62, a voice coil motor, and a permanent magnet is attached to an inner side of the voice coil yoke 65, thereby forming a static magnetic field.

The stacked magnetic disks 4a-4c possess recording regions respectively in their front faces and back faces and, corresponding to this, there becomes a structure in which the four actuator arms 64a-64d formed in the carriage 60 are stacked. The HGA 70a is attached to the actuator arm 64a and the HGA 70f to the actuator arm 64d, respectively, and the HGAs 70b, 70c are attached to the actuator arm 64b and the HGAs 70d, 70e are attached to the actuator arm 64c, respectively.

Each of the HGAs 70a-70f is constituted by a magnetic head performing the reading and the writing of the data or any one of them between it and the disk, a slider to which the magnetic head has been attached, a flexure flexibly supporting the slider so as to be capable of performing a pivot operation, and a load beam supporting the flexure so as to exert a pressure toward a disk face on the slider.

The base 2 accommodating in its interior space the magnetic disk 4, the spindle motor 5, the HSA 6 and the like is constituted by a magnetic disk accommodation region 2a consisting of a circular concave part accommodating the magnetic disk 4 and an HSA accommodation region 2b accommodating the HSA 6, and additionally there is formed a flat part 2d for mounting the top cover 3 to a circumference of an opening edge 2c under a stable state. In the flat part 2d, there are provided threaded holes 2e for fixing the top cover 3 by screws 10. In the present embodiment, the threaded holes are provided in six places becoming an end part of the base 2. The material of the base 2 is aluminum which is easy to be molded by the die-cast.

In the top cover 3, an escape hole 3a for the screw allows the screw to penetrate therethrough together with the threaded hole 2e of the base 2 when the top cover 3 is attached to a predetermined position of the base 2. The material of the top cover 3 is stainless steel because, in order to form a thin structure, aluminum is insufficient in its strength.

Further, as shown in FIG. 1(B), in a contact portion between the flat part 2d of the base 2 and the top cover 3, and a contact portion between a head part 10a of the screw 10 and the top cover 3, there are respectively dispensed a slip mechanism 20 reducing a slip friction resistance. As this slip mechanism 20, a lubricant is desirable, and it is applied to each contact portion. Since the lubricant can reduce the slip friction resistance of the contact portion, in a case where the flat part 2d of the base 2 and the top cover 3 are screwed by a specified thread fastening torque, even if the bimetal effect occurs, it is possible to cause the base 2 and the top cover 3 to slip in the plane direction of the base 2 concerned. Accordingly, it is possible to prevent the deformations of the base 2 and the top cover 3 by the bimetal effect.

As the lubricant, for example, a fluoro-lubricant having a functional group bonding with a metal is desirable. Since the fluoro-lubricant coats a surface of the metal by being firmly bonded to the surface of the metal through the functional group bonding with the metal, it is possible to hold a slip action for a long time. As the fluoro-lubricant, perfluoropolyether is enumerated. Further, in order to wash the surface of the metal, as a solvent of this lubricant there is used Nobekku HFE 7100 made by Sumitomo 3M Co., Ltd., that is hydro-fluoroether.

Further, in the contact portion of the top cover 3 contacting with the flat part 2d of the base 2, there is formed an oil receiving groove 31. An oil receiving groove 32 is formed also in the contact portion of the top cover 3 contacting with the head part 10a of the screw 10. By forming these oil receiving grooves 31, 32 in the top cover 3, it is possible to prolong the life of the lubricant. Incidentally, the oil receiving groove may be provided in the flat part 2d, of the base 2, contacting with the top cover 3.

Further, an interstice is provided between an internal diameter ID of the escape hole 3a for the screw of the top cover 3 and an external diameter ED of a threaded part 10b of the screw 10. By this interstice, even if the base 2 and the top cover 3 slip toward a direction parallel to the flat part 2d of the base 2 by the bimetal effect, a displacement by this slip is absorbed. Accordingly, it is possible to prevent the deformation of the base 2 and the top cover 3 by the bimetal effect.

Additionally, a range in which the slip mechanism 20 is dispensed is a range in which a pressure is exerted on the flat part 2d of the base part 2 and the top cover 3 by screwing-in the screw 10. This is because, except this range in which the pressure is exerted, the base 2 and the top cover 3 can slip even if the slip mechanism 20 is not provided.

In the magnetic disk unit 1 as described, under a temperature environment in which the aluminum base 2 does not deform, no bimetal effect occurs in the base 2 and the top cover 3. However, under such a temperature environment in which the aluminum base 2 deforms, the bimetal effect occurs. On this occasion, as shown in FIG. 1(B), although a vector quantity VQ1 of the displacement of the base 2 and a vector quantity VQ2 of the displacement of the top cover 3 are different, since the lubricants 20 are applied respectively to the contact portion, of the top cover 3, contacting with the flat part 2d of the base 2 and the contact portion, of the top cover 3, contacting with the head part 10a of the screw 10, it is possible to cause the base 2 and the top cover 3 to slip. By causing the base 2 and the top cover 3 to slip, since it is possible to prevent the deformations of the base 2 and the top cover 3, it is possible to prevent the positional relation between each of the magnetic disks 4a-4b of the magnetic disk 4 and each of the magnetic heads of the HGAs 70a-70f from deviating, or the floating posture of each of the sliders of the HGAs 70a-70f from changing. Accordingly, even if the use environment temperature changes, by maintaining the positional relation between the magnetic disk 4 and the head, it becomes possible to prevent the output dysfunction of the head.

In the present embodiment, as the slip mechanism 20, although the lubricant has been used, it is not limited to this. A mirror surface part in which mirror-like finishing has been applied may be provided in the contact portion between the flat part 2d of the base 2 and the top cover 3, and the contact portion between the head part 10a of the screw 10 and the top cover 3. By providing this mirror surface part in each of the contact portions, since the mirror surface parts 20 contact each other, the contact portion between the flat part 2d of the base 2 and the top cover 3 and the contact portion between the head part 10a of the screw 10 and the top cover 3 can respectively reduce the slip friction resistance.

A surface roughness of this mirror surface part 20 may be about 0.1 μm-0.5 μm in an Ra value, and desirably 0.1 μm-0.2 μm. By selecting this range of the Ra value, it is possible to reduce the slip friction resistance, and it is possible to suppress a working cost to the utmost from rising. Here, the Ra value is the surface roughness defined in JIS B0601 1994 and mentions an arithmetic mean roughness.

Further, by using this mirror surface part and the lubricant in combination, the slip mechanism 20 can more effectively reduce the slip friction resistance in each of the contact portions.

The slip mechanism 20 can be applied also to such a magnetic disk unit as shown in FIG. 1(B), having a sealing rubber 33 which is pressure-bonded by the flat part 2d of the base 2 and the top cover 3 and which seals a base inside, without being limited to the magnetic disk unit 1 of such a constitution as mentioned above. The sealing rubber 33 is fitted to a groove (not shown in the drawing) having been formed in the flat part 2d of the base 2. This groove exists in an inner side with respect to the threaded hole 2e having been provided in the flat part 2d of the base 2 and is formed so as to depict a closed, curved line in the vicinity of an end part of the base 2 concerned. In the magnetic disk unit having the sealing rubber 33 as shown, since it is possible to separate the slip mechanism 20 from the base interior, it becomes unnecessary to take a suppression of a discharged gas by the lubricant into consideration. Accordingly, it is possible to widen a selection width of the lubricant.

Further, in the embodiment mentioned above, as the slip mechanism 20, although the lubricant and the mirror surface part have been enumerated as exemplification, it is not limited to this, and it suffices if, in a portion in which the flat part 2d and the top cover 3 contact, there is constituted such that a friction coefficient in a tightening part of the screw 10 becomes lower than a friction coefficient of other portion, and there may be provided whatever connection structure of the flat part 2d and the top cover 3.

Further, in the embodiment mentioned above, although the material of the base 2 is die-cast aluminum and the material of the top cover 3 is stainless steel, they are not limited to these, and other materials can be used so long as they are metals, whose thermal expansion coefficients differ, capable of being used as the base and the top cover of the magnetic disk unit.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk unit having:
   a magnetic disk;
   a head drive mechanism in which there has been mounted a head accessing the magnetic disk;
   a base accommodating the magnetic disk and the head drive mechanism, and possessing a flat part, in which a threaded hole is formed, in a circumference of an opening edge; and
   a top cover which is formed by a material whose thermal expansion coefficient differs from a thermal expansion coefficient of a material of the base, in which there is provided an escape hole, for a screw, position-aligned to the threaded hole of the flat part, and which is attached to the base by the screw penetrating through the threaded hole and the escape hole for the screw,
   wherein a slip mechanism reducing a slip friction resistance is provided in a first contact portion between the flat part and the top cover, and a second contact portion between a head part of the screw and the top cover,
   wherein the slip mechanism comprises a lubricant applied to the first and second contact portions, a first oil receiving groove formed in the top cover proximate the first contact portion, and a second oil receiving groove formed in the top cover proximate the second contact portion.

2. A magnetic disk unit according to claim 1, wherein the lubricant is a fluoro-lubricant.

3. A magnetic disk unit according to claim 2, wherein the lubricant is perfluoro-polyether.

4. A magnetic disk unit according to claim 1, wherein the slip mechanism comprises a mirror surface part in which smooth and reflective finishing is provided in each of the first and second contact portions.

5. A magnetic disk unit according to claim 4, wherein a surface roughness of the mirror surface part is about 0.1 μm-0.5 μm in an Ra value.

6. A magnetic disk unit according to claim 5, wherein a surface roughness of the mirror surface part is about 0.1 μm-0.2 μm in an Ra value.

7. A magnetic disk unit according to claim 1, wherein the slip mechanism comprises a mirror surface part in which smooth and reflective finishing is provided in each of the first and second contact portions.

8. A magnetic disk unit according to claim 1, wherein a range in which the slip mechanism is dispensed is a range in which a pressure is exerted on the flat part and the top cover by screwing-in the screw.

9. A magnetic disk unit according to claim 1, wherein the base is formed by a die-cast of aluminum, and the top cover is formed by a stainless steel.

10. A magnetic disk unit according to claim 1, further comprising a sealing rubber which is pressure-bonded by the flat part and the top cover, and which seals an interior of the base.

11. A magnetic disk unit having:
    a magnetic disk;

a head drive mechanism in which there has been mounted a head accessing the magnetic disk;

a base accommodating the magnetic disk and the head drive mechanism, and possessing a flat part, in which a threaded hole is formed, in a circumference of an opening edge; and a top cover which is formed by a material whose thermal expansion coefficient differs from a thermal expansion coefficient of a material of the base, in which there is provided an escape hole, for a screw, position-aligned to the threaded hole of the flat part, and which is attached to the base by the screw penetrating through the threaded hole and the escape hole for the screw, wherein a first contact portion is provided between the flat part and the top cover, and a second contact portion is provided between a head part of the screw and the top cover, wherein a first oil receiving groove is formed in the top cover proximate the first contact portion, and a second oil receiving groove is formed in the top cover proximate the second contact portion, a lubricant being applied to the first and second contact portions, wherein, in the first and second contact portions, a friction coefficient in a tightening part of the screw becomes lower than a friction coefficient of another portion of the screw.

12. A connection structure of a base and a top cover in a storage device, comprising:

a base accommodating constitutional elements of the storage device and possessing a flat part, in which a threaded hole is formed, in a circumference of an opening edge; and a top cover which is formed by a material whose thermal expansion coefficient differs from a thermal expansion coefficient of a material of the base, in which there is provided an escape hole, for a screw, position-aligned to the threaded hole of the flat part, and which is attached to the base by the screw penetrating through the threaded hole and the escape hole for the screw, wherein a first contact portion is provided between the flat part and the top cover, and a second contact portion is provided between a head part of the screw and the top cover, wherein a first oil receiving groove is formed in the top cover proximate the first contact portion, and a second oil receiving groove is formed in the top cover proximate the second contact portion, a lubricant being applied to the first and second contact portions, wherein, in the first and second contact portions, a friction coefficient in a tightening part of the screw becomes lower than a friction coefficient of another portion of the screw.

13. A connection structure according to claim 12, wherein the base is formed by a die-cast of aluminum, and the top cover is formed by a stainless steel.

* * * * *